(12) United States Patent
Lehar et al.

(10) Patent No.: US 9,038,391 B2
(45) Date of Patent: May 26, 2015

(54) SYSTEM AND METHOD FOR RECOVERY OF WASTE HEAT FROM DUAL HEAT SOURCES

(75) Inventors: Matthew Alexander Lehar, Munich (DE); Vittorio Michelassi, Bayern (DE)

(73) Assignee: General Electric Company, Niskayuna, NY (US)

(*) Notice: Subject to any disclaimer, the term of this patent is extended or adjusted under 35 U.S.C. 154(b) by 378 days.

(21) Appl. No.: 13/429,318

(22) Filed: Mar. 24, 2012

(65) Prior Publication Data

US 2013/0247570 A1 Sep. 26, 2013

(51) Int. Cl.
| | |
|---|---|
| *F01K 27/00* | (2006.01) |
| *F01K 25/10* | (2006.01) |
| *F01K 7/42* | (2006.01) |
| *F01K 23/10* | (2006.01) |
| *F22B 1/18* | (2006.01) |
| *F22B 35/08* | (2006.01) |

(52) U.S. Cl.
CPC ............ *F01K 25/103* (2013.01); *F01K 7/42* (2013.01); *F01K 23/10* (2013.01); *F22B 1/1815* (2013.01); *F22B 35/086* (2013.01)

(58) Field of Classification Search
USPC .......................................................... 60/676
See application file for complete search history.

(56) References Cited

U.S. PATENT DOCUMENTS

| | | | |
|---|---|---|---|
| 3,830,062 A | 8/1974 | Morgan et al. | |
| 4,873,827 A * | 10/1989 | Hadano et al. | ............... 60/646 |
| 5,361,585 A * | 11/1994 | Westphal et al. | ............... 60/646 |
| 6,523,347 B1 | 2/2003 | Jirnov et al. | |
| 6,672,063 B1 | 1/2004 | Proeschel | |
| 7,197,876 B1 | 4/2007 | Kalina | |
| 2002/0011242 A1* | 1/2002 | Ruppel et al. | ............... 123/563 |
| 2009/0000299 A1 | 1/2009 | Ast et al. | |
| 2009/0266075 A1* | 10/2009 | Westmeier et al. | ............. 60/651 |
| 2010/0071368 A1 | 3/2010 | Kaplan et al. | |
| 2010/0205967 A1 | 8/2010 | Gopalkrishna et al. | |

(Continued)

FOREIGN PATENT DOCUMENTS

| | | |
|---|---|---|
| EP | 2410153 A2 | 1/2012 |
| EP | 2522828 A2 | 11/2012 |
| GB | 2010974 A | 7/1979 |

(Continued)

OTHER PUBLICATIONS

Search Report and Written Opinion from corresponding PCT Application No. PCT/US2013/031845 dated Jun. 24, 2013.

(Continued)

*Primary Examiner* — Thomas Denion
*Assistant Examiner* — Mickey France
(74) *Attorney, Agent, or Firm* — Andrew J. Caruso

(57) ABSTRACT

A waste heat recovery system includes a heat recovery cycle system coupled to at least two separate heat sources having different temperatures. The heat recovery cycle system is coupled to a first heat source and at least one second heat source. The heat recovery cycle system is configured to circulate a working fluid. The at least one second heat source includes a lower temperature heat source than the first heat source. The working fluid is circulatable in heat exchange relationship through a first heat exchange unit, a second heat exchange unit for heating the working fluid in the heat recovery cycle system. The first heat exchange unit is coupled to the at least one second heat source to heat at least a portion of a cooled stream of working fluid to a substantially higher temperature.

26 Claims, 1 Drawing Sheet

(56) References Cited

U.S. PATENT DOCUMENTS

2011/0016863 A1    1/2011  Ernst
2012/0131920 A1*   5/2012  Held et al. .................. 60/650

FOREIGN PATENT DOCUMENTS

| WO | 9107573 | A2 | 5/1991 |
| WO | 2008125827 | A2 | 10/2008 |
| WO | 2013007530 | A1 | 1/2013 |

OTHER PUBLICATIONS

M. Bianchi et al.; "Bottoming cycles for electric energy generation: Parametric investigation of available and innovative solutions for the exploitation of low and medium temperature heat sources"; Corresponding author. Tel.: +39 0512093318; fax: +39 0512093313; E-mail address: andrea.depascale@mail.ing.unibo.it (A. De Pascale); 10 pages.

* cited by examiner

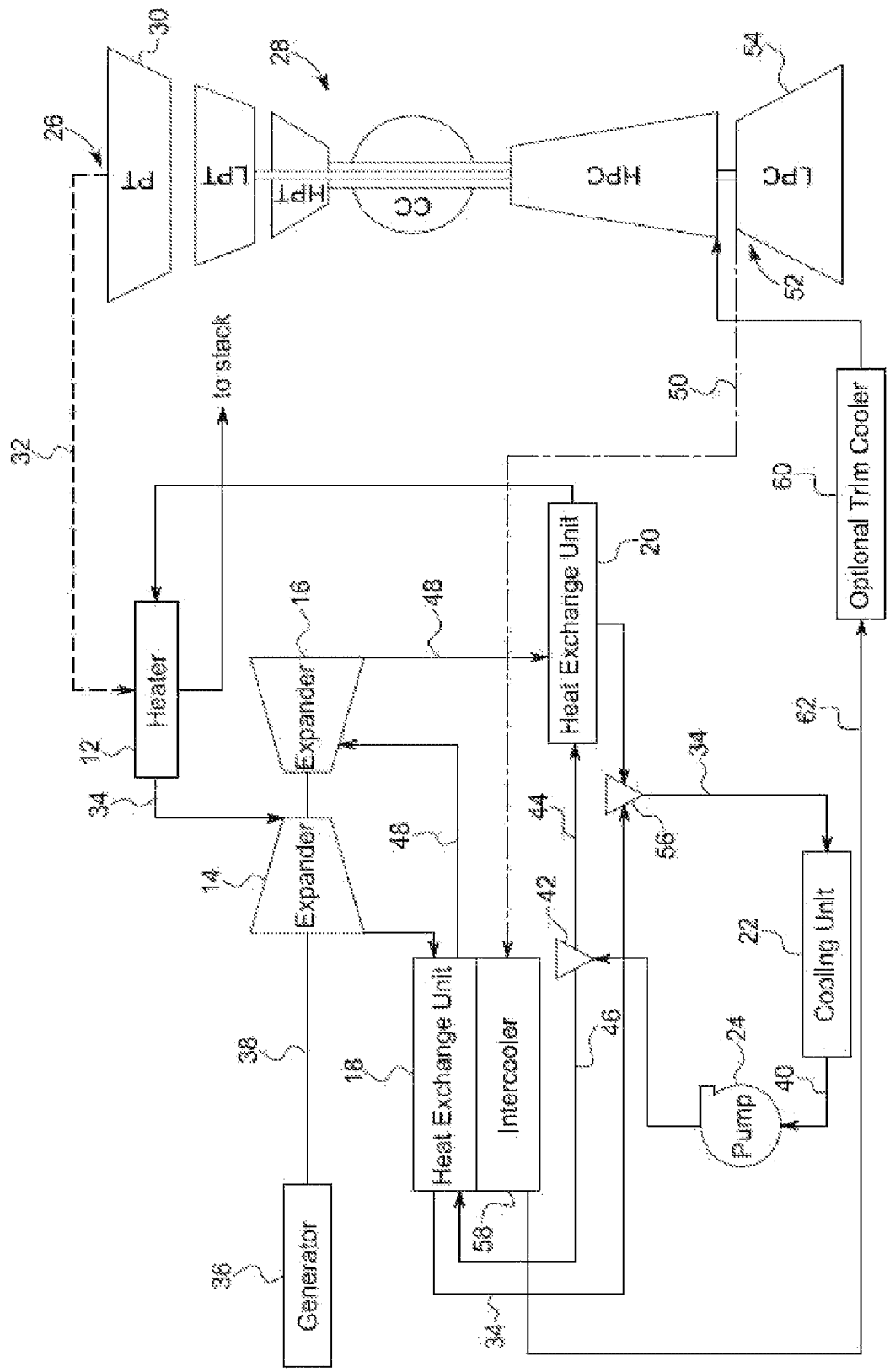

SYSTEM AND METHOD FOR RECOVERY OF WASTE HEAT FROM DUAL HEAT SOURCES

BACKGROUND

The embodiments disclosed herein relate generally to the field of power generation and, more particularly, to a system and method for recovering waste heat from a plurality of heat sources having different temperatures for generation of electricity.

Enormous amounts of waste heat are generated by a wide variety of industrial and commercial processes and operations. Example sources of waste heat include exhaust streams and heat from space heating assemblies, steam boilers, engines, and cooling systems. Many fuel-burning engines, besides producing an exhaust stream at high temperature, also give off heat at a lower temperature in lubricating oil, cooling fluid, or compressor intercooler air. Although bottoming cycles can be used to recover additional electrical or shaft power from the hot exhaust gases given off by the engine, they are generally not configured to make efficient use of the available lower-temperature heat sources.

When waste heat is low grade, such as waste heat having a temperature below 300 degrees Celsius, for example, conventional heat recovery systems do not operate with sufficient efficiency to make recovery of energy cost-effective. The net result is that vast quantities of waste heat are simply dumped into the atmosphere, ground, or water.

One method to generate electricity from waste heat involves single cycle systems or two-cycle systems that are used in heat recovery applications with waste heat sources of different temperature levels. Single-cycle configurations collect heat from the different waste heat locations in a serial arrangement of heat exchange units with an intermediate heating fluid. This "all-in-one" configuration lowers the maximum resulting fluid vapor temperature because the available heat from the various temperature level heat sources is mixed. An undesirable result of this configuration is a lowered Carnot efficiency. In two-cycle configurations, the hot heat source heats a high-boiling point liquid in a top loop, and the cold heat source heats a low-boiling point liquid in a separate bottom loop. Although, the two-cycle system generally achieves a better performance than a single cycle, components in the two-cycle system are more complex and require more components. As a result, the overall cost of the two-cycle system is significantly higher.

In another conventional system provided to generate electricity from waste heat, a cascaded organic rankine cycle system for utilization of waste heat includes a pair of organic rankine cycle systems, including two working fluids. The cycles are combined, and the respective organic working fluids are chosen such that the organic working fluid of the first organic rankine cycle is condensed at a condensation temperature that is above the boiling point of the organic working fluid of the second organic cycle. A single common heat exchange unit is used for both the condenser of the first organic rankine cycle system and the evaporator of the second organic rankine cycle. A cascaded organic rankine cycle system converts surplus heat into electricity within certain temperature ranges but does not recover waste heat over a wide temperature range, due to an upper temperature limit on the organic fluid of about 250° C. imposed by tendency to degrade rapidly at higher temperatures.

It would be desirable to have a system that effectively recovers waste heat over a wide temperature range from multiple heat sources utilizing a single working fluid.

BRIEF DESCRIPTION

In accordance with one exemplary embodiment disclosed herein, a waste heat recovery system including a heat generation system and a heat recovery system. The heat generation system including at least two separate heat sources having different temperatures. The at least two separate heat sources include a first heat source and at least one second heat source. The heat recovery system is configured to circulate a single working fluid, and includes a heater, a first heat exchange unit and a second heat exchange unit. The heater is configured to circulate a working fluid in heat exchange relationship with a hot fluid so as to vaporize the working fluid. The first heat exchange unit is coupled to the heater, wherein the vaporized working fluid is circulatable in heat exchange relationship through the first heat exchange unit for heating at least a portion of the working fluid in the heat recovery cycle system. At least a portion of the working fluid is circulatable in heat exchange relationship through the second heat exchange unit for heating at least a portion of the working fluid in the heat recovery cycle system. The heat recovery cycle system is coupled to a first heat source among the at least two separate heat sources and at least one second heat source among the at least two separate heat sources. The heat recovery cycle system is configured to remove heat from the first heat source and the second heat source.

In accordance with one exemplary embodiment disclosed herein is a waste heat recovery system including a combustion engine and a heat recovery cycle system. The combustion engine includes one heat source having an engine exhaust unit and at least one additional heat source selected from the group comprising a lower temperature intercooler, a higher temperature intercooler, a low pressure compressor exhaust unit, or combinations thereof. The one heat source comprises a higher temperature heat source than the at least one additional heat source. The heat recovery cycle system includes a heater, a cooling unit, at least two expanders, a first heat exchange unit and a second heat exchange unit. The heat recovery cycle system is coupled to the engine exhaust unit and the at least one additional heat source and configured to circulate a working fluid. The first heat exchange unit is coupled to the heater and the at least one additional heat source, wherein at least a portion of the working fluid is circulatable in heat exchange relationship through the first heat exchange unit for heating of the working fluid in the heat recovery cycle system. At least a portion of the working fluid is circulatable in heat exchange relationship through the second heat exchange unit for heating of the working fluid in the heat recovery cycle system. The heat recovery cycle system is configured to remove heat from the engine exhaust unit and the at least one additional heat source.

In accordance with one exemplary embodiment disclosed herein is a waste heat recovery system including a combustion engine and a heat recovery cycle system. The combustion engine includes one heat source having an engine exhaust unit and at least one additional heat source selected from the group comprising a lower temperature intercooler, a higher temperature intercooler, a low pressure compressor exhaust unit, or combinations thereof. The one heat source and the at least one additional heat source have different temperatures, wherein the one heat source comprises a higher temperature heat source than the at least one additional heat source. The heat recovery cycle system includes a heater and at least two expanders coupled to at least one generator unit, a first heat exchange unit and a second heat exchange unit. The heater is coupled to the engine exhaust unit. The heat recovery cycle system is configured to circulate a working fluid. The working fluid comprises carbon dioxide (CO2). The first heat exchange unit is coupled to the heater and at least one additional heat source. At least a portion of the working fluid is circulatable in heat exchange relationship through the first heat exchange unit for heating the working fluid in the heat recovery cycle system. At least a portion of the working fluid is circulatable in heat exchange relationship through the second heat exchange unit for heating the working fluid in the heat recovery cycle system. The heat recovery cycle system is configured to remove heat from the engine exhaust unit and the at least one additional heat source.

Various refinements of the features noted above exist in relation to the various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the present disclosure without limitation to the claimed subject matter.

DRAWINGS

These and other features, aspects, and advantages of the present disclosure will become better understood when the following detailed description is read with reference to the accompanying drawing, wherein:

FIG. 1 is a diagrammatical representation of a waste heat recovery system in accordance with an exemplary embodiment disclosed herein.

DETAILED DESCRIPTION

In accordance with the embodiment discussed herein, a heat recovery cycle system for recovering waste heat from dual sources is disclosed. The exemplary heat recovery cycle system includes a heater configured to circulate a working fluid in heat exchange relationship with a hot fluid so as to vaporize the working fluid. The heat recovery cycle system includes a first heat exchange unit configured to circulate a first vaporized stream of the working fluid from the heater in heat exchange relationship with a first portion of a cooled stream of the working fluid so as to heat the first portion of the cooled stream of the working fluid. The heat recovery cycle system further includes a second heat exchange unit configured to circulate a second vaporized stream of the working fluid in heat exchange relationship with a second portion of a cooled stream of the working fluid so as to heat the second portion of the cooled stream of the working fluid before being re-fed to the heater. In accordance with the exemplary embodiment of the present disclosure, the heat recovery cycle system is integrated with a first heat source and a second heat source to allow a higher efficient recovery of waste heat for generation of electricity. The first and second heat sources may include combustion engines, gas turbines, geothermal, solar thermal, industrial and residential heat sources, or the like.

Referring to FIG. 1, a heat recovery cycle system 10 is illustrated in accordance with an exemplary embodiment of the present disclosure. The illustrated heat recovery cycle system 10 includes a heater 12, a first expander 14, a second expander 16, a first heat exchange unit, or recuperator, 18, a second heat exchange unit, or recuperator, 20, a cooling unit 22 and a pump 24. A single working fluid is circulated through the heat recovery cycle system 10.

The heater 12 is coupled to a first heat source 26. In the illustrated embodiment, heater 12 is coupled to an engine 28, and more particularly to an engine exhaust unit, such as a power turbine 30, of the engine 28. Heater 12 is configured to receive a high-temperature exhaust stream 32 originating from the discharge of the power turbine 30. The heater 12 receives heat from high-temperature exhaust stream 32 generated by the power turbine 30 and heats a working fluid so as to generate a first vaporized stream 34 of the working fluid. More specifically, the working fluid is warmed at an elevated pressure to a superheated state in the heater 12 by the high-temperature exhaust stream 32. The first vaporized stream 34 of the working fluid is passed through the first expander 14 to expand the first vaporized stream 34 of the working fluid to a lower pressure and to drive a generator unit 36 via a shaft 38. The first expander 14 may be an axial type expander, an impulse type expander, a high temperature screw type expander or a radial-inflow turbine type of expander. After passing through the first expander 14, the first vaporized stream 34 of the working fluid, discharged at a relatively lower pressure and lower temperature, is passed through the first heat exchange unit, or recuperator, 18 to the cooling unit 22. The first vaporized stream 34 is cooled to near-ambient temperature in the first heat exchange unit 18. The first vaporized stream 34 is next further cooled, and may be condensed, into a liquid or a dense supercritical state suitable for pumping, in the cooling unit 22, so as to generate a cooled stream 40 of the working fluid. The cooled stream 40 of the working fluid is then pumped using the pump 24 to a control valve 42, whereby the cooled stream 40 is split into two streams: a first portion 46 and a second portion 44. In an embodiment, the first vaporized stream 34 may be simply cooled supercritically, to a dense-phase supercritical fluid, before being pumped up to pressure.

The second portion 44 of the cooled stream 40 returns to the heater 12, via the second heat exchange unit, recuperator, 20. In the illustrated embodiment, the control valve 42 is coupled between the first heat exchange unit 18 and the second heat exchange unit 20 and configured to control the flow of the cooled stream 40 from the cooling unit 22 to the first heat exchange unit 18 and the second heat exchange unit 20 during system operation dependent upon additional heat provided from a second heat source (described presently).

The first portion 46 of the cooled stream 40 returns to the first heat exchange unit 18 where it is warmed to an intermediate temperature of the discharge from the first expander 14, and more particularly to the temperature of the first vaporized stream 34, in order to undergo a second expansion through the second expander 16. More specifically, the first heat exchange unit 18 is configured to circulate the first vaporized stream 34 of the working fluid from the first expander 14 in heat exchange relationship with the first portion 46 of the cooled stream 40 of the working fluid to heat the first portion 46 of the cooled stream 40 of the working fluid and generate a second vaporized stream 48 of the working fluid. The heat transferred from the first vaporized stream 34 to the first portion 46 of the cooled stream 40 in the first heat exchange unit 18, may be supplemented with supplemental heat from a supplemental intercooler air stream 50 having a temperature comparable to the first vaporized stream 34 at the discharge of the first expander 14. In this particular example, the supplemental heat is provided by the supplemental intercooler air stream 50, discharged from a second heat source 52, and more particularly a discharge air stream from the engine 28. As best illustrated in FIG. 1, the supplemental intercooler air stream 50 originates from a low-pressure compressor exhaust unit and more particularly a discharge of a low-pressure compressor 54 in engine 28. The larger the amount of heat available from the supplemental intercooler air stream 50, the larger the proportion of the cooled stream 40 that may be channeled by the control valve 42 to the first heat exchange unit 18, rather than to the second heat exchange unit 20. The heat from both the first heat source 26 and the second heat source 52 can be optimally utilized by adjusting the flow ratio at the control valve 42.

The second vaporized stream 48 of the working fluid is passed through the second expander 16 to expand the second vaporized stream 48 of the working fluid and to drive a second generator unit (not shown) or the first generator unit 36 via shaft 38. The second expander 16 may be an axial type expander, an impulse type expander, a high temperature screw type expander, or a radial-inflow turbine type of expander. After passing through the second expander 16, the second vaporized stream 48 of the working fluid is passed through the second heat exchange unit 20 and back to the cooling unit 22. The second heat exchange unit 20 is configured to circulate the second vaporized stream 48 of the working fluid from the second expander 16 in heat exchange relationship with the second portion 44 of the cooled stream 40 of the working fluid to heat the second portion 44 of the working fluid before being fed to the heater 12. A second control valve 56 is coupled between the first heat exchange unit 18 and the second heat exchange unit 20 and configured to control the flow of the second vaporized stream 48 from the second expander 16 and the first vaporized stream 34 from the first expander 14 to the cooling unit 22. The second vaporized stream 48 of the working fluid is combined via the second control valve 56 with the first vaporized stream 34 prior to reaching the cooling unit 22. The combined first vaporized stream 34 and the second vaporized stream 48 are cooled, so as to generate the cooled stream 40 of the working fluid. The cooled stream 40 of the working fluid is then pumped using the pump 24 to the heater 12 via the second heat exchange unit 20 (as previously described) or to the second expander 16 via the first heat exchange unit 18 (as previously described). The cycle may then be repeated.

The heat recovery cycle system 10 may further include an intercooler 58 coupled to the first heat exchange unit 18 and the supplemental intercooler air stream 50 and a trim cooler 60 coupled to the intercooler 58 and the engine 28.

In the illustrated embodiment, there are two instances of heat exchange (may also be referred to as "intra-cycle" transfers of heat) between a high pressure stream of the working fluid and a low pressure stream of the working fluid. In the first instance, the first vaporized stream 34 of the working fluid is circulated in heat exchange relationship with the first portion 46 of the cooled stream 40 of the working fluid to heat the first portion 46 of the cooled stream 40 of the working fluid and generate the second vaporized stream 48 of the working fluid. This exchange of heat serves to boil or otherwise increase the enthalpy (if the first portion 46 of the cooled stream 40 of the working fluid is at a sub-critical temperature) of the first portion 46 of the cooled stream 40 of the working fluid, so that the second vaporized stream 48 of the working fluid may then undergo another expansion in the second turbine 16. In the second instance, the second vaporized stream 48 of the working fluid from the second expander 16 is circulated in heat exchange relationship with the second portion 44 of the cooled stream 40 of the working fluid to heat the second portion 44 of the cooled stream 40 of the working fluid. The second portion 44 of the cooled stream 40 of the working fluid is fed to the heater 12 and heated using the first heat source 26 to complete the circuit of flow. The first heat exchange unit 18 and the second heat exchange unit 20 function as "recuperators" in the system 10.

The first heat exchange unit 18 is disclosed as coupled to any one or more second heat sources 52 such as the discharge stream from the low-pressure compressor 54. Such second heat sources 52 are also typically coupled to the engine 28. The one or more second heat sources 52 are configured to provide additional heat or partially vaporize (with "or" as used herein meaning either or both) the first portion 46 of the cooled stream 40 of working fluid. More particularly, the first portion 46 of the cooled stream 40 of working fluid is passed through the heat exchange unit 18 that in conjunction with the intercooler 58 provides for heating and/or evaporation or even superheating of the first portion 46 of the cooled stream 40 of working fluid. In an embodiment, the first heat exchange unit 18 is coupled to at least two second heat sources 52 with the at least two second heat sources 52 being coupled either in series or parallel. It should be noted herein that the second heat source 52 includes a lower temperature heat source than the first heat source 26. In one example, the temperature of the second heat source 52 may be in the range of 80 to 300 degrees Celsius. It should be noted that in other exemplary embodiments, first and second heat sources 26, 52 may include other multiple low-grade heat sources such as gas turbines with intercoolers. The first heat exchange unit 18 receives heat from the first vaporized stream 34 and generates the second vaporized stream 48. In one example, the second vaporized stream 48 may be at a pressure of 250 bar and temperature of approximately 250 degrees Celsius. The second vaporized stream 48 is passed through the second expander 16. In the illustrated embodiment, the first expander 14 and the second expander 16 are coupled to the single generator unit 36 via shaft 38. In certain other exemplary embodiments, the second expander 16 (which in one example comprises a screw type compressor) may be configured to drive a second generator unit (not shown).

The illustrated layout of the second heat sources 52 facilitates effective heat removal from the plurality of lower temperature engine heat sources. This increases the effectiveness of the cooling systems and provides effective conversion of waste heat into electricity.

In the illustrated embodiment, the working fluid includes carbon dioxide. The usage of carbon dioxide as the working fluid has the advantage of being non-flammable, non-corrosive, and able to withstand high cycle temperatures (for example above 400 degrees Celsius). In one embodiment as described above, carbon dioxide may be heated super critically to temperatures without substantial risk of chemical decomposition. The two distinct intra-cycle transfers of heat following an initial expansion of the working fluid allows the working fluid to produce more work through successive expansions than that would be possible with a single expansion process (as in conventional Rankine cycle operation). In other embodiments, other working fluids are also envisaged.

Referring again to FIG. 1, in the illustrated waste heat recovery system 10, in one example, the temperature of the high-pressure exhaust stream 32 from the first heat source 26 of the engine 28 may be in the temperature range of 450 to 500 degrees Celsius. The heater 12 receives heat from the high-pressure exhaust stream 32 generated from the first heat source 26 and generates a working fluid vapor as the first vaporized stream 34. In one example, the first vaporized stream 34 may be at a pressure of 250 bar and temperature of approximately 450 degrees Celsius. The first vaporized stream 34 is passed through a first expander 14 (which in one example comprises a radial type expander) to drive the generator unit 36. After passing through the first expander 14, the first vaporized stream 34 is passed through the first heat exchange unit 18 and then condensed into a liquid in the cooling unit 22 to form the cooled stream 40, which is then pumped via a pump 24 to the control valve 42. In one example, the first vaporized stream 34 may be supplied to the cooling unit 22 at a pressure of 80 bar and 70 degrees Celsius. In one example, the first portion 46 of the cooled stream 40 may be supplied to the first heat exchange unit 18 at a pressure of 250 bar and 50 degrees Celsius. In one example, the second portion 44 of the cooled stream 40 may be supplied to the second heat exchange unit 20 at a pressure of 250 bar and 50 degrees Celsius. In one example, the second vaporized stream 48 from the first heat exchange unit 18 is supplied to the second expander 16 at a pressure of approximately 250 bar and an approximate temperature of 350 degrees Celsius. In one example, the supplemental intercooler air stream 50 from the second heat source 52 is provided as a low temperature air stream and may be supplied to the intercooler 58 at a pressure of 3 bar and an approximate temperature of 250 degrees Celsius. In one example, an intercooled air stream 62 from the intercooler 58 is provided as a low temperature air stream and may be supplied to the optional trim cooler 60 and back to engine 28 at a pressure of 3 bar and an approximate temperature of 70 degrees Celsius. It should be noted herein that the temperature and pressure values discussed above are exemplary values and should not be construed as limiting values. The values may vary depending on the applications.

As discussed previously, after passing through the first expander 14, the first vaporized stream 34 of the working fluid at a relatively lower pressure and lower temperature is passed through the first heat exchange unit 18 to the cooling unit 22. The cooling unit 22 is explained in greater detail herein. In the illustrated embodiment, the cooling unit 22 is an air-cooled unit. The first vaporized stream 34 of the working fluid exiting through the first heat exchange unit 18 is passed via an air cooler (not shown) of the cooling unit 22. The air cooler 22 is configured to cool the first vaporized stream 34 of the working fluid using ambient air.

In conventional systems, it may not be possible to condense carbon dioxide in many geographical locations if ambient air is employed as a cooling medium for a cooling unit, since ambient temperatures in such geographical locations routinely exceed critical temperature of carbon dioxide. In accordance with the embodiments of the present disclosure, carbon dioxide may or may not be condensed depending on circumstances. The disclosed system operates in a similar manner when there is no condensation, except that the fluid is simply cooled supercritically, to a dense-phase supercritical fluid, before being pumped up to pressure.

As discussed previously, after passing through the second expander 16, the second vaporized stream 48 of the working fluid is passed through the second heat exchange unit 20 to the cooling unit 22. The second vaporized stream 48 of the working fluid exiting through the second heat exchange unit 20 is passed via the air cooler of the cooling unit 22. Similar to the cooling of the first vaporized stream 34, the air cooler is configured to cool, and may condense, the second vaporized stream 48 of the working fluid using ambient air.

Although the above embodiments are discussed with reference to carbon dioxide as the working fluid, in certain other embodiments, other low critical temperature working fluids suitable for heat recovery cycle systems, such as a Rankine cycle or Brayton cycle, are also envisaged. As discussed herein, ensuring the availability of a cooling flow for the heat recovery cycle facilitates the availability of a cooling flow adequate to cool the working fluid as ambient cooling temperature rises during the summer season. In accordance with the exemplary embodiment, the cooling unit and the low-pressure stage of the turbine are reduced in volume for heat recovery cycles employing carbon dioxide as the working fluid. The exemplary heat recovery cycle system as described herein, by employing dual waste heat sources at various different temperatures, rather than just a single, high-temperature waste heat source, provides a system capable of a significantly higher output of power. Also, the exemplary heat recovery cycle employing a dual heat source input as described herein has a compact footprint and consequently faster ramp-up time than heat recovery cycles employing steam as the working fluid.

While only certain features of the disclosed embodiment have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A waste heat recovery system comprising:
   a heat generation system comprising at least two separate heat sources having different temperatures, wherein the at least two separate heat sources comprise a first heat source and at least one second heat source; and
   a heat recovery system configured to circulate a single working fluid, the heat recovery cycle system comprising:
      a heater, configured to circulate the single working fluid in heat exchange relationship with a hot fluid so as to vaporize the single working fluid and output a first vaporized stream of the single working fluid;
      a first heat exchange unit coupled to the heater, wherein the first vaporized stream of the single working fluid is circulatable in heat exchange relationship through the first heat exchange unit for heating a second portion of a cooled stream of the single working fluid in the heat recovery cycle system, the second portion output as a second vaporized stream of the single working fluid; and
      a second heat exchange unit, wherein the second vaporized stream of the single working fluid is circulatable in heat exchange relationship through the second heat exchange unit for heating a first portion of the cooled stream of the single working fluid in the heat recovery cycle system,
      wherein the heat recovery cycle system is coupled to a first heat source among the at least two separate heat sources and at least one second heat source among the at least two separate heat sources, and
      wherein the heat recovery cycle system is configured to remove heat from the first heat source and the second heat source.

2. The recovery system of claim 1, wherein the single working fluid comprises carbon dioxide (CO2).

3. The recovery system of claim 1, wherein the first heat exchange unit is coupled to the at least one second heat source, and wherein the at least one second heat source is selected from a group comprising an intercooler, a compressor exhaust unit, or combinations thereof.

4. The recovery system of claim 1, wherein the at least one second heat source is configured to at least partially heat the second portion of the cooled stream of the single working fluid.

5. The recovery system of claim 1, wherein the first heat exchange unit is configured to receive a supplemental intercooler air stream from the at least one second heat source to heat the second portion of the cooled stream of the single working fluid to a higher temperature before entering an expander.

6. The recovery system of claim 1, wherein the first heat source comprises an engine exhaust unit.

7. The recovery system of claim 1, further comprising a first expander in flow communication with the heater, wherein the first expander comprises at least one of a radial expander, an axial expander, a screw expander or an impulse expander.

8. The recovery system of claim 7, further comprising a second expander in flow communication with the heater, wherein the second expander comprises at least one of a radial expander, an axial expander, a screw expander or an impulse expander.

9. The recovery system of claim 8, wherein the first heat exchange unit is coupled to the second expander and configured to heat the second portion of the cooled stream of the single working fluid to a higher temperature before entering the second expander.

10. The recovery system of claim 8, wherein the first expander and the second expander are coupled to a generator unit.

11. The recovery system of claim 8, wherein the first expander is coupled to a first generator unit and the second expander is coupled to a second generator unit.

12. The recovery system of claim 1, further comprising a cooling unit, wherein the working fluid from the first heat exchange unit and the second heat exchange unit is fed through the cooling unit.

13. The recovery system of claim 12, further comprising a pump situated between the cooling unit and the first heat exchange unit and the second heat exchange unit.

14. The recovery system of claim 13, further comprising a first control valve situated in a flow path between the first heat exchange unit and the second heat exchange unit, the control valve being operable to control a flow of the cooled stream of the single working fluid entering the first heat exchange unit and the second heat exchange unit.

15. The recovery system of claim 14, further comprising a second control valve situated in a flow path between the first heat exchange unit and the second heat exchange unit, the control valve being operable to control a flow of the first vaporized stream of working fluid and the second vaporized stream of working fluid entering the cooling unit.

16. The recovery system of claim 1, wherein the heat generation system comprises a combustion engine.

17. A waste heat recovery system comprising:
a combustion engine comprising one heat source having an engine exhaust unit and at least one additional heat source selected from the group comprising an intercooler, a compressor exhaust unit, or combinations thereof, the one heat source comprising a higher temperature heat source than the at least one additional heat source;
a heat recovery cycle system comprising:
a heater, a cooling unit and at least two expanders, wherein the heat recovery cycle system is coupled to the engine exhaust unit and the at least one additional heat source and configured to circulate a working fluid and output a first vaporized stream of the working fluid;
a first heat exchange unit coupled to the heater and the at least one additional heat source, wherein the first vaporized stream of the working fluid is circulatable in heat exchange relationship through the first heat exchange unit for heating a second portion of a cooled stream of the working fluid in the heat recovery cycle system, the second portion output as a second vaporized stream of the working fluid; and
a second heat exchange unit, wherein the second vaporized stream of the working fluid is circulatable in heat exchange relationship through the second heat exchange unit for heating a first portion of the cooled stream of the working fluid in the heat recovery cycle system,
wherein the heat recovery cycle system is configured to remove heat from the engine exhaust unit and the at least one additional heat source.

18. The recovery system of claim 17, wherein the working fluid comprises carbon dioxide ($CO_2$).

19. The recovery system of claim 17, wherein the heater is coupled to the first heat source.

20. The recovery system of claim 17, wherein the at least one additional heat source is configured to heat the second portion of the cooled stream of the working fluid.

21. The recovery system of claim 20, wherein the first heat exchange unit is coupled to a second expander and configured to heat the first portion of the cooled stream of working fluid to a higher temperature before entering the second expander.

22. The recovery system of claim 20, wherein the first heat exchange unit is configured to receive a supplemental intercooler air stream from the at least one second heat source to heat the first portion of the cooled stream of working fluid to a temperature before entering the second expander.

23. The recovery system of claim 17, further comprising a pump, wherein the pump is situated between the cooling unit and the first heat exchange unit and the second heat exchange unit.

24. The recovery system of claim 17, further comprising a first control valve situated in a flow path between the first heat exchange unit and the second heat exchange unit, the control valve being operable to control a flow of the cooled stream of working fluid entering the first heat exchange unit and the second heat exchange unit.

25. The recovery system of claim 17, wherein the first expander and the second expander are coupled to at least one generator unit.

26. A waste heat recovery system comprising:
a combustion engine comprising one heat source having an engine exhaust unit and at least one additional heat source selected from the group comprising an intercooler, a compressor exhaust unit, or combinations thereof, the one heat source and the at least one additional heat source having different temperatures, wherein the one heat source comprises a higher temperature heat source than the at least one additional heat source;
a heat recovery cycle system configured to circulate a working fluid, the heat recovery cycle system comprising:
a heater and at least two expanders coupled to at least one generator unit, wherein the heater is coupled to the engine exhaust unit and configured to circulate the working fluid and output a first vaporized stream of the working fluid, and wherein the working fluid comprises carbon dioxide ($CO_2$);
a first heat exchange unit coupled to the heater and at least one additional heat source, wherein the first vaporized stream of the working fluid is circulatable in heat exchange relationship through the first heat exchange unit for heating a second portion of a cooled stream of the working fluid in the heat recovery cycle system, the second portion output as a second vaporized stream of the working fluid; and a second heat exchange unit, wherein the second vaporized stream of the working fluid is circulatable in heat exchange relationship through the second heat exchange unit for heating a first portion of the cooled stream of the working fluid in the heat recovery cycle system, wherein the heat recovery cycle system is configured to remove heat from the engine exhaust unit and the at least one additional heat source.

* * * * *